United States Patent [19]

Itaya

[11] Patent Number: 5,500,994
[45] Date of Patent: Mar. 26, 1996

[54] METHOD OF MANUFACTURING A ROTOR

[75] Inventor: Hideki Itaya, Chiba, Japan

[73] Assignee: Mabuchi Motor Co., Ltd., Matsudo, Japan

[21] Appl. No.: 307,468

[22] Filed: Sep. 19, 1994

[30] Foreign Application Priority Data

Dec. 30, 1993 [JP] Japan .................................. 5-353595

[51] Int. Cl.⁶ ........................................... H02K 15/02
[52] U.S. Cl. ........................... 29/598; 29/608; 264/277.2; 310/43; 310/156
[58] Field of Search ................. 29/598, 596, 608; 264/272.15, 272.2, 272.19; 310/42, 43, 156

[56] References Cited

U.S. PATENT DOCUMENTS 3,872,334  3/1975  Loubier ...................... 310/43
4,059,898  11/1977  Adair ......................... 29/598

FOREIGN PATENT DOCUMENTS 62-191365  12/1992  Japan .

*Primary Examiner*—Carl E. Hall
*Attorney, Agent, or Firm*—Armstrong, Westerman, Hattori, McLeland & Naughton

[57] ABSTRACT

A miniature electric motor has a stator mounted within a casing and a rotor provided so as to face the stator. The rotor includes a rotary shaft rotatably supported to the casing, a rotor body into which the rotary shaft is inserted, the rotor body being made of plastic, and a magnetic layer formed on an outer circumferential surface of the rotary body and made of rare earth plastic magnetic material. Accordingly, it is possible to obtain a high torque even with a small amount of rare earth plastic magnet and to avoid separation or cracks of the magnetic layer.

4 Claims, 10 Drawing Sheets

METHOD OF MANUFACTURING A ROTOR

BACKGROUND OF THE INVENTION

The present invention relates to a miniature electric motor such as a stepping motor, more particularly to a rotor thereof and a method for producing the rotor.

Miniature electric motors are widely used in various fields of precision equipment such as compact cameras, audio visual system such as video tape recorders, and automotive electronic equipment. A stepping motor, a brushless motor or the like may be exemplified as a miniature motor having a structure in which permanent magnets are used in its rotor. For instance, the stepping motor is widely used as a drive source for various type electronic equipment such as a printer.

Such a miniature motor is provided with a stator mounted within a casing and a rotor which faces the stator. Permanent magnets are provided in the rotor so that the rotor may be attracted and rotated by magnetic forces produced by the stator.

It is general that the overall rotor body (i.e., rotor yoke) mounted on a rotary shaft is molded with magnets into a one-piece structure, or otherwise a magnetic layer is adhered with adhesives onto an outer circumferential surface of the rotor body made of metal to form a double structure.

By the way, recently, there has been an increased demand to provide a miniature electric motor which has a high torque power and which is of a power saving type. For enhancing the torque, there are methods to increase current and to use permanent magnets, which generate strong magnetic forces, in the rotor.

The former method, i.e., a method to increase current, has to be an intrinsic limit. This could not meet the requirement of saving the power. For this reason, recently, rare earth plastic magnets which may produce strong magnetic forces with a small amount of current for generation of high torque power have been frequently used in the rotor instead of ferrite magnets that have been generally conventionally used.

However, the rare earth plastic magnets are several times more expensive than the ferrite magnets, so that it is desirable to reduce the amount of the material as much as possible.

In case of the above-described one-piece type rotor, it is relatively easy to obtain a high precision in coaxiality between the rotary shaft and the rotor. In addition, it is possible to enjoy the advantage that the number of the assembling steps therefor may be reduced because of the one-piece structure.

However, the conventional one-piece structure suffers from a disadvantage that a large amount of expensive rare earth plastic magnets is needed. It should be noted that there is a method in which a space is formed in an interior of the rotor body to thin its layer in order to reduce the amount of the used rare earth plastic magnets. However, the rare earth plastic magnets are fragile so that a mechanical strength of the rotor body is low, resulting in easy generation of cracks or breaks.

In contrast thereto, in case of the above-described double structure rotor, a difference in a thermal expansion coefficient between the rotary body made of metal and the magnetic layer composed of rare earth plastic magnet is large (for example, several tens times to several hundreds times). A stepping motor or the like which is used in a wide temperature range (for example, from −40° C. to +120° C.) and under an environment where the temperature is widely changed suffers from a problem that a separation or crack of the magnetic layer tends to be generated.

Accordingly, it would be difficult to reduce the material cost and the inertia moment by thinning the magnetic layer. Also, since the rotor body is made of metal, the rotor as a whole is heavy to bring about a large amount of inertia moment.

Further, since the magnetic layer made of rare earth plastic magnet is fixed to the rotary body with adhesives, a thickness of the adhesives would be localized to degrade the precision of coaxiality.

Also, a stepping motor in which the rotor body is made of plastic and a ferrite plastic magnet layer is fixed to an outer periphery of the rotor body has been proposed. This rotor is light in weight because the rotor body is made of plastic. However, the plastic magnets fixed to the outer circumferential surface are not made of rare earth plastic magnetic material but of ferrite plastic magnetic material. There is no consideration to reduce the amount of the material or to avoid the separation and cracks at all.

SUMMARY OF THE INVENTION

In order to solve the above-noted defects, an object of the present invention is to provide a miniature electric motor having a rotor by which it is possible to obtain a high torque even with a small amount of rare earth plastic magnet and to avoid any separation or cracks of the magnetic layer of the rotor. Also, an object of the invention is to provide a method for producing such a rotor of the motor.

Another object of the invention is to enhance right circular cylinder property of the rotor and its coaxiality.

Also, still another object of the invention is to reduce a weight of the rotor and to reduce an inertia moment. Also, an object of the invention is to firmly fix the magnetic layer to the rotor body.

In order to attain these and other objects, according to the present invention, there is provided a miniature electric motor comprising: a stator mounted within a casing; and a rotor provided so as to face the stator; the rotor including: a rotary shaft rotatably supported to the casing; a rotor body into which the rotary shaft is inserted, the rotor body being made of plastic; and a magnetic layer formed on an outer circumferential surface of the rotary body and made of rare earth plastic magnetic material.

Preferably, corrugations are formed on the outer circumferential surface of the rotor body.

The magnetic layer is formed in a "thin film" state on the outer circumferential surface of the rotor body.

The motor may be of a stepping type and a large hollow space may be formed inside of the rotor body.

The magnetic layer is in the form of a sleeve where a plurality of magnetic poles each extending in parallel to a rotational centerline C are arranged in a circumferential direction, and a multiple pole magnetization is effected on the sleeve-like outer surface so that N- and S-poles are arranged alternatively.

The magnetic layer covers at least part of the outer circumferential surface of the rotor body, corresponding to magnetic poles.

The magnetic layer covers an entire surface of the outer circumferential surface of the rotor body.

The magnetic layer is in intimate contact with the outer circumferential surface of the rotor body in one, and the outer surface of the magnetic layer has a circularity with high precision to form a shape with high coaxiality on a rotational center which is identical with a rotational centerline of the rotary shaft.

It is preferable that an air-gap between the stator and the rotor is in a range of about 0.2 to about 0.1 mm, and a thickness of the magnetic layer is 1 mm or less. It is more preferable that the thickness of the magnetic layer is in a range of about 0.6 to about 0.8 mm.

A plurality of annular grooves are juxtaposed in a direction of the centerline in the outer circumferential surface of the rotor body to thereby form the corrugations.

Recess portions are formed in the outer circumferential surface of the rotor body at positions corresponding to respective magnetic poles of the magnetic layer to thereby form the corrugations on the outer circumferential surface.

The plurality of recess portions are elongated in a direction from an axially central portion to each side face and are uniformly arranged in the circumferential direction, and wherein N- and S-poles are alternatively magnetized in a staggered manner relative to the axially central portion, and the respective recess portions are alternatively formed so as to conform with the positions of the respective magnetic poles and to terminate at the axially central portion.

The annular corrugations having a saw-toothed cross-sectional shape are formed in the circumferential direction on the outer circumferential surface of the rotor body, and the recess portions are formed at crest portions of the saw-toothed shape.

The rare earth plastic magnetic material has polar anisotropic or radial anisotropic characteristics.

The rare earth plastic magnetic material may be a mixture of magnetic powder of rare earth magnetic material and plastic, and has a softening point t2 being substantially the same as a softening point t1 of the rotor body in a range of about 170° C. to about 240° C., and the plastic is selected from at least one from nylon (PA) and polyphenylene sulfide, and the rare earth magnetic material is selected from neodymium-iron-boron, samarium-cobalt and alnico.

A difference in thermal expansion coefficient between the materials of the rotor body and the magnetic layer is less than ten times or less.

Each material of the rotor body and the magnetic layer has a thermal expansion coefficient in a range of about $3 \times 10^{-5}$ to about $5 \times 10^{-5}$ mm/°C.

The plastic material forming the rotor body has a softening point t1 higher than a motor use temperature T, and the softening point t1 is in the range of about 170° C. to about 240° C.

The plastic material is composed of at least one selected from the group essentially consisting of polybutylene terephthalate, polyacetal and nylon (PA), and includes glass fiber.

The rotary shaft is inserted into and fixed within a through-hole formed in a center of the rotor body, and the rotary shaft and the rotor body are firmly fixed to each other by a bush for preventing a relative rotation.

The motor may be of the type selected from a stepping motor type and a brushless motor type.

According to the invention, there is provided a stepping motor having a stator provided within a casing and including a magnetizing coil and a rotor provided inside of the stator through an air-gap in the range of about 0.2 to about 0.1 mm relative to the stator; the rotor including: a rotor body having an outer circumferential surface on which corrugations are formed and in which a large hollow space is formed for reducing weight; a rotary shaft rotatably supported to the casing by bearing members, and inserted into and fixed to a through-hole formed along a rotational centerline in the rotor body; and a magnetic layer formed in a thin film state having a thickness in the range of about 0.6 to about 0.8 mm to cover an entire surface of the outer circumferential surface, the magnetic layer having an outer surface having a circularity with high precision, made of rare earth plastic magnetic material and having a shape with a high precision coaxiality with the same rotational center as that of the rotational centerline of the rotary shaft; wherein a plurality of magnetic poles each extending in parallel with the rotational centerline are juxtaposed in the circumferential direction in the magnetic layer, a multiplicity of N- and S-poles are alternatively uniformly magnetized on the outer surface, and recess portions are formed at positions corresponding to the respective magnetic poles; wherein the plastic material forming the rotary body and having a softening point t1 higher than a motor use temperature T is selected from the group essentially consisting of polybutylene terephthalate, polyacetal and nylon (PA) in addition to glass fiber; and wherein the rare earth plastic magnetic material forming the magnetic layer is a mixture of plastic material of at least one selected from the group essentially consisting of nylon and polyphenylene sulfide and magnetic powder of rare earth magnet of at least one selected from the group of neodymium-iron-boron, samarium-cobalt and alnico, the rare earth plastic material having a softening temperature t2 that is substantially equal to the softening point t1 of the rotor body.

According to another aspect of the invention, there is provided a method for producing a rotor for a miniature electric motor in which a stator is provided within a casing and the rotor is provided so as to face the stator, comprising the following steps of: inserting a rotary shaft into a body of the rotor made of plastic; subsequently incorporating the rotor body into a molding die and at the same time positioning the rotary shaft relative to the molding die; and thereafter, injecting rare earth plastic magnet, heated and molten at a temperature higher than a softening point t1 of the rotor body, into the molding die and forming a magnetic layer on an outer circumferential surface of the rotor body.

It is preferable that corrugations are formed, in advance, on the outer circumferential surface of the rotor body before incorporating the rotor body into the molding die.

The method may further comprise the steps of: removing the rotor from the molding die and gradually cooling the rotor down to a room temperature after forming the magnetic layer on the outer circumferential surface of the rotor body; and thereafter, effecting a multiple pole magnetization to alternatively arrange N- and S-poles on an outer periphery of the magnetic layer.

Plastic material forming the rotary body and having a softening point t1 higher than a motor use temperature T is composed of at least one selected from the group essentially consisting of polybutylene terephthalate, polyacetal and nylon (PA), and includes glass fiber; whereby when the rare earth plastic magnet is injected onto the outer circumferential surface of the rotor body, a surface layer of the outer circumferential surface is softened or molten so that a joint portion with the rare earth plastic magnet is mutually engaged and mixed; and during a process of the mixture phenomenon, a part of the glass fiber is introduced into and entangled with the rare earth plastic magnet from the outer circumferential surface.

DESCRIPTION OF THE PREFERRED EMBODIMENTS

The present invention will now be described by way of example with reference to the accompanying drawings.

The invention may be applied to a miniature electric motor provided with a rotor including permanent magnets, such as a stepping motor and a brushless motor. In the following description, a stepping motor that may be used as a drive source for electronic equipment such as a printer, a copier, a facsimile machine, a type writer and the like will be explained by way of example with reference to FIGS. 1 through 15C.

A stepping motor 1 shown is of a PM type (Permanent Magnet Type) and has such a structure that a rotor including permanent magnets is attracted and rotated by magnetic forces produced by a stator winding. For example, the stepping motor 1 is used as a drive source for a printer.

Figure 1:
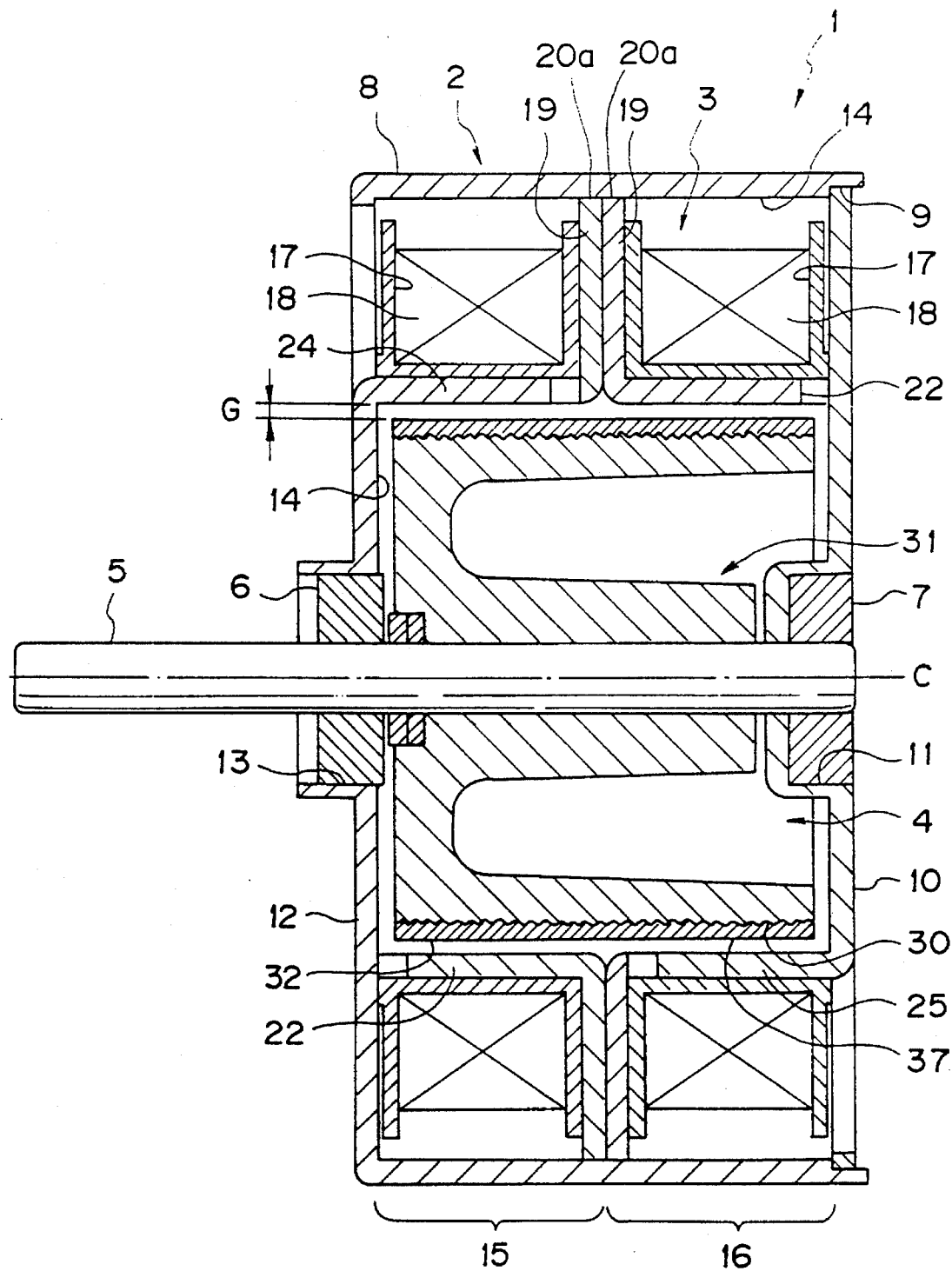
FIG. 1 is a cross-sectional view showing a stepping motor according one embodiment of the invention.
Figure 2:
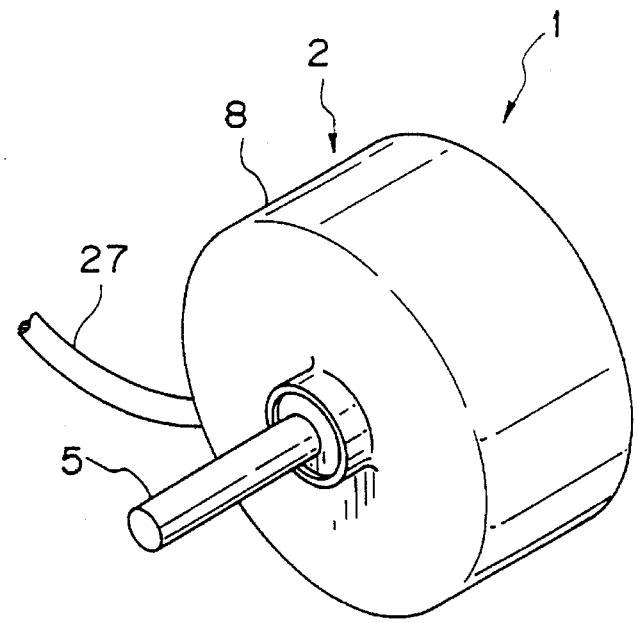
FIG. 2 is a perspective view showing an outer appearance shown in FIG. 1.

As shown in FIGS. 1 and 2, a stator 3 is mounted within a casing 2. A rotor 4 provided to face the stator 3 and disposed within the stator 3 is provided also within the casing 2. A rotary shaft 5 made of metal and fixed to a center of the rotor 4 along a rotary centerline C is rotatably supported by bearing members 6 and 7 provided in the casing 2.

The casing 2 has a housing 8 formed into a bottomed hollow sleeve and made of metal material having ferromagnetism, and a cover member 10 formed of the same metal material as that of the housing 8. The cover member 10 is fixed to an opening portion 9 of the housing 8 by press-fitting, welding or the like.

The bearing member 7 is fixed within a mount recess portion 11 which has a circular shape in cross section and which is formed at a central portion of the cover member 10. The bearing member 6 is fixed within a mount hole 13 formed in a central portion of a side wall 12 of the housing 8. The bearing members 6 and 7 are of oilless type, which members are made of synthetic resin having lubricant property, or powder sintered metal or powder sintered alloy impregnated with lubricating oil.

The stator 3 is fixed to an inner surface 14 of the housing 8 and is made of a first block 15 and a second block 16 juxtaposed in the centerline C direction and disposed in back-to-back relation with each other.

A stator winding is wound around an annular bobbin 17 of the first block 15 to form an annular exciting magnetic coil 18. The bobbin 17 is formed integrally of electrical insulating material such as insulating synthetic resin, for example, polybutylene terephthalate (PBT) or the like.

Figure 3:
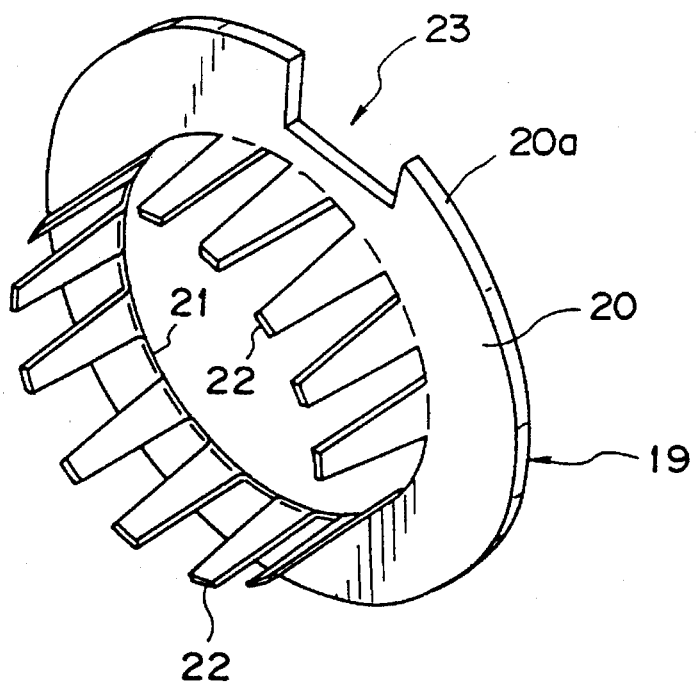
FIG. 3 is a perspective view showing a stator core shown in FIG. 1.

A stator core 19 for supporting the bobbin 17 is made of ferromagnetic metal material. As shown in FIG. 3, the stator core 19 is provided with an annular disk portion 20 and comb-shaped magnetic poles 22 which extend in parallel with the centerline by bending an inner circumferential edge 21 of the disk portion 20. The plural comb-shaped magnetic poles 22 are arranged uniformly along the inner circumferential edge 21. A recess portion 23 is formed in the outer circumferential portion of the disk portion 20 for mounting a connecting terminal (not shown).

As shown in FIG. 1, comb-shaped magnetic poles 24 are formed on the housing side wall 12. The comb-shaped magnetic poles 24 are formed to extend in parallel with and along the centerline C by cutting and bending parts of the housing 8 toward an interior of the motor. The magnetic poles 24 are arranged uniformly in the circumferential direction. The number of the magnetic poles 24 is the same as that of the magnetic poles 22.

Comb-shaped poles 25 formed by cutting and bending parts of the cover member 10 toward the interior of the motor 1 are provided in the cover member 10. The same number of magnetic poles 25 as that of the magnetic poles 22 extend in parallel with the centerline C and are arranged uniformly in the circumferential direction.

The stator core 19 of the first block 15 is arranged to face the side wall 12 of the housing 8 so that its magnetic poles 22 are engaged at a predetermined gap with the magnetic poles 24 formed on the housing 8. In the same manner, the stator core 19 of the second block 16 is disposed to face the cover member 10 so that its magnetic poles 22 are engaged at a predetermined gap with the magnetic poles 25 of the cover member 10.

The bobbin 17 having the coil 18 is fixed to the stator core 19, the housing inner surface 14 and the magnetic poles 24 to form the first block 15. The second block 16 arranged in back-to-back relation with the first block 15 is composed of the bobbin 17 having the coil 18, the stator core 19 and the magnetic poles 25 of the cover member 10.

The disk portions 20 for the stator cores 19 of the first and second blocks 15 and 16 are intimately fixed to each other. The bobbin 17 of the first block 17 and the outer edges 20a of the disk portions 20 of the two stator cores 19 are fixed to the housing inner surface 14.

The coil 18 is electrically connected to a current supply line 27 (FIG. 2) mounted on the connecting terminal (not shown), for supplying current from an external power source (not shown) to the coil 18 through the current supply line 27 and the connecting terminal.

In the first block 15, a first magnetic circuit through which magnetic flux produced by the coil 18 passes is formed by the housing 8, the disk portion 20 and the magnetic poles 22 of the stator core 19, and the magnetic poles 24 formed in one piece with the housing 8.

Also, in the second block 16, a second magnetic circuit through which magnetic flux produced by the coil 18 passes is formed by the housing 8, the cover member 10, the magnetic poles 25 formed in one piece with the cover member 10, and the magnetic poles 22 and the disk portion 20 of the stator core 19.

The rotor 4 is disposed with a fine air-gap G radially inwardly of the first and second blocks 15 and 16. The rotor 4 is provided with the rotary shaft 5, a rotor body 31 through which the rotary shaft 5 passes along the centerline C and which is made of plastic and provided at its outer circumferential surface 30 with corrugations, and a magnetic layer 32 made of rare earth plastic magnet laid on the outer circumferential surface 30 of the rotor body 31. The plastic material which forms the rotor body 31 has a softening point t1 which is higher than the motor use temperature T.

In the embodiment, the magnetic layer 32 is in a cylindrical shape where a plurality of magnetic poles extending in parallel with the rotary centerline C are arranged in the circumferential direction. The magnetic layer 32 is provided to cover the entire surface of the outer circumferential surface 30 of the rotor body 31. Incidentally, it suffices that the magnetic layer 32 is provided to cover only the part of the outer circumferential surface 30, for example, at least part, corresponding to the magnetic poles, of the outer circumferential surface 30.

The magnetic layer 32 is formed by effecting a multiple pole magnetization such that N-poles and S-poles are arranged in an alternative manner on the cylindrical outer circumferential surface 37. The magnetic layer 32 is made of polar anisotropic or radial anisotropic rare earth plastic magnet.

When currents which have phase different from each other are caused to flow through the respective coils 18 of the first block 15 and the second block 16 through the current supply line 27 in the thus constructed motor 1, the respective coils 18 are alternatively excited to generate magnetic forces through the first and second magnetic circuits. The positions of the magnetic poles 22, 24 and 25 which are magnetized by the respective coils 18 are displaced at a predetermined step angle one after another.

Then, the magnetic poles of the magnetic layer 32 is attracted by the magnetic forces of the magnetic poles 22, 24 and 25 which are magnetized in order so that the rotor 4 is rotated at a predetermined step angle. Thus, the electronic equipment such as the printer or the like is driven through the rotary shaft 5 rotated together with the rotor 4 by the magnetic forces.

A structure of the rotor 4 will be described with reference to FIGS. 4 through 13.

Figure 4:
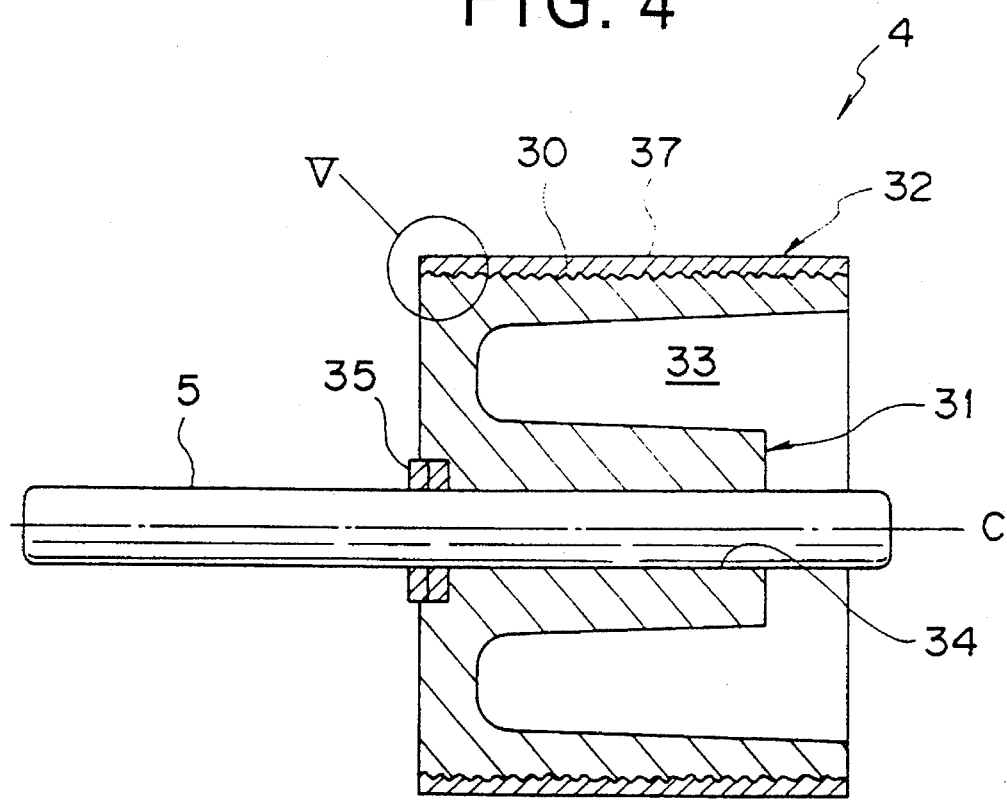
FIG. 4 is a longitudinal sectional view showing a rotor shown in FIG. 1.
Figure 5:
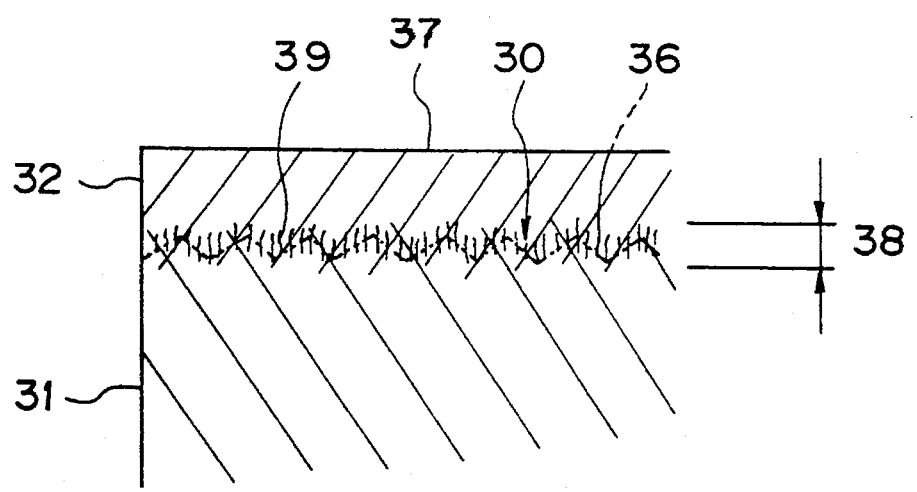
FIG. 5 is an enlarged sectional view showing a part indicated by V in FIG. 4.

As shown in FIGS. 4 and 5, the rotor body 31 is in the form of a sleeve, in which a hollow space 33 is formed for reduction of weight. The rotary shaft 5 is fitly inserted in a through-hole 34 formed along the centerline C of the rotary body 31. The rotary shaft 5 and the rotor body 31 are firmly fixed to each other by a bush 35 for preventing the relative rotation.

The corrugations 36 are formed on the outer circumferential surface 30 of the rotor body 31. The magnetic layer 32 is formed in intimate contact with the outer circumferential surface 30 having the corrugations 36 in one. The outer surface 37 of the magnetic layer 32 is a right circular cylinder which has a high precision circularity and has a high coaxiality with the rotary shaft 5 having the rotary centerline C.

The rotary body 31 is molded of plastic material which is composed of at least one selected from the essentially consisting of polybutylene terephthalate, polyacetal and nylon (PA), and includes glass fiber. Any plastic material specified above has a softening point t1 in a range of about 170° C. to 240° C. The softening point t1 is higher than the motor use temperature T which is generally in a range of, for example, about −40° C. to about +120° C. Therefore, the rotor body 31 will never be softened during the rotation of the motor 1.

Incidentally, in some cases, there are motors whose motor use temperature T would exceed 120° C. and reach about 180° C. In such a case, it is sufficient to select the plastic material having the softening point t1 which exceeds the motor use temperature T.

On the other hand, the rare earth plastic magnet which is a raw material for the magnetic layer 32 is a mixture of magnetic powder of rare earth magnetic material and plastic. The plastic may be selected from, for example, nylon (PA), polyphenylene sulfide, and the like. The rare earth magnetic material may be selected from, for example, neodymium-iron-boron (Nd—Fe—B), samarium-cobalt (Sm—Co), alnico {commercial name of permanent magnetic steel including iron (Fe), aluminum (Al), nickel (Ni) and cobalt (Co)} and the like. These materials may be used solely or in combination.

The softening point t2 of the rare earth plastic magnet is almost the same as the softening point t1 of the rotor body 31, for example, in the range of about 170° C. to about 240° C. The softening point t2 may be set to any other suitable temperature.

In the case where the magnetic layer 32 is molded on the outer circumferential surface 30 of the rotor body 31, an injection molding technology using molding dies is utilized.

More specifically, when the rare earth plastic magnet heated and molten at a temperature that is higher than the softening point t1 of the rotor body 31 is injected onto the body outer circumferential surface 30, the outer circumferential surface 30 is also heated above the softening point t1 with its surface portion being softened or molten and is engaged at a joint portion 38 with the rare earth plastic magnet so that the rotor body 31 and the rare earth plastic magnet are engaged and mixed with each other at the joint portion 38. Thereafter, the rare earth plastic magnet that has returned to a room temperature is solidified to form the magnetic layer 32 so that the rotor body 31 and the magnetic layer 32 are formed into one piece.

In the process of mixture phenomenon, a part of the glass fiber 39 is introduced into and entangled with the rare earth plastic magnet from the outer circumferential surface side. As a result, there is no clear interface between the rotor body 31 and the magnetic layer 32, so that the one-piece structure of the rotor body 31 and the magnetic layer 32 is further strengthened.

Also, the corrugations 36 are formed on the outer circumferential surface 30 of the rotor body 31. Thus, a surface area of the outer circumferential surface 30 is increased and it is likely that the rare earth plastic magnet that has been molten during the injection molding and the plastic material of the body outer circumferential surface 30 may readily be mixed with each other.

In the thus produced rotor 4, both the components 31 and 32 are firmly coupled in one and in addition thereto, the corrugations 36 serve as resistance to thereby avoid a fear that both the components 31 and 32 would be displaced during the motor rotation or the like.

Since the two components 31 and 32 are firmly integrated in a monolithic state, it is possible to form the magnetic layer 32 into a "thin film" state on the outer circumferential surface 30 of the rotor body 31. This makes it possible to considerably reduce the amount of the rare earth plastic magnet in comparison with the conventional technology. The "thin film" state magnetic layer 32 has a sufficient mechanical strength which is durable against vibrations or the like during the motor rotation or against collision or shock during the magnetization.

As in the embodiment, it is possible to apply the thin film state magnetic layer 32 over the entire surface of the outer circumferential surface 30. It is however possible to further reduce the amount of used rare earth plastic magnet by covering a part of the outer circumferential surface 30, for example, at least magnetic pole portions thereof.

Also, since the rotor body 31 and the magnetic layer 32 are integrally formed with each other, the coaxiality of the two components 31 and 32 may be enhanced in comparison with the conventional structure using adhesives. If the rotary shaft 5 is exactly positioned in molding dies having high precision and the outer circumferential surface 37 is molded, it is possible to further considerably enhance the circularity and the coaxiality of the rotor 4.

Thus, since the circularity of the outer circumferential surface 37 and the coaxiality of the two components 31 and 32 are enhanced, the vibration of the outer circumferential surface 37 during the rotation of the rotor 4 is extremely suppressed so that the air-gap G between the stator 3 and the rotor 4 may be reduced. This makes it possible to increase the magnetic attraction force for high torque property of the motor and to reduce the air-gap G down to, for example, a range of about 0.2 to about 0.1 mm in the motor 1. As a result, it is possible to enhance the torque by, for example, 10 to 20% of the conventional case.

Also, since it is possible to reduce the air-gap G, it is possible to further reduce a thickness of the magnetic layer 32 and to reduce the amount of used rare earth plastic magnet while realizing the high torque property. More specifically, a thickness of 3 mm or more was required for generating a predetermined torque in the conventional double structure ferrite magnet. In contrast, according to the invention, it is possible to generate a sufficient torque with the magnetic layer 32 of the rare earth plastic magnet having a thickness of 1 mm or less (for example, a range of about 0.6 to about 0.8 mm).

In the case where the rotor body 31 and the magnetic layer 32 are formed of the materials specified above, a thermal expansion coefficient of any material is in a range of about $3 \times 10^{-5}$ to about $5 \times 10^{-5}$ mm/°C. and is almost the same as or very close to each other. Accordingly, an amount of deformation caused by the heat is very small between the rotor body 31 and the magnetic layer 32.

For instance, even if the temperature of the rotor 4 is largely changed during the rotation of the motor, or the cooled state after the injection molding, there is no fear that the joint portion 38 between the two components 31 and 32 would be damaged due to the thermal expansion or contraction, resulting in the separation or cracks of the magnetic layer 32. Incidentally, if the difference in the thermal expansion coefficient between the two components 31 and 32 is substantially in the range within ten times or less, it has been confirmed that there is no practical problem.

By the way, in many cases, the stepping motor 1 takes a rapid rotational motion through the predetermined step angle and stops thereat immediately thereafter. In such a case, it is necessary to reduce the weight of the rotor 4 to thereby reduce the inertia moment.

For this case, according to the invention, it is possible to considerably reduce the weight of the rotor 4 in comparison with the conventional case by forming a large space 33 in the rotor body 31 made of light and physically strong plastic and at the same time forming into the thin film state the magnetic layer 32 made of the rare earth plastic magnetic material. Accordingly, it is possible to reduce the amount of the used rare earth plastic magnet and to reduce the inertia moment. In addition, there is no fear of generation of breaks, cuts or cracks.

FIGS. 6 through 13 show several modifications of the rotor body which has not yet been subjected to the magnetic layer.

Figure 6:
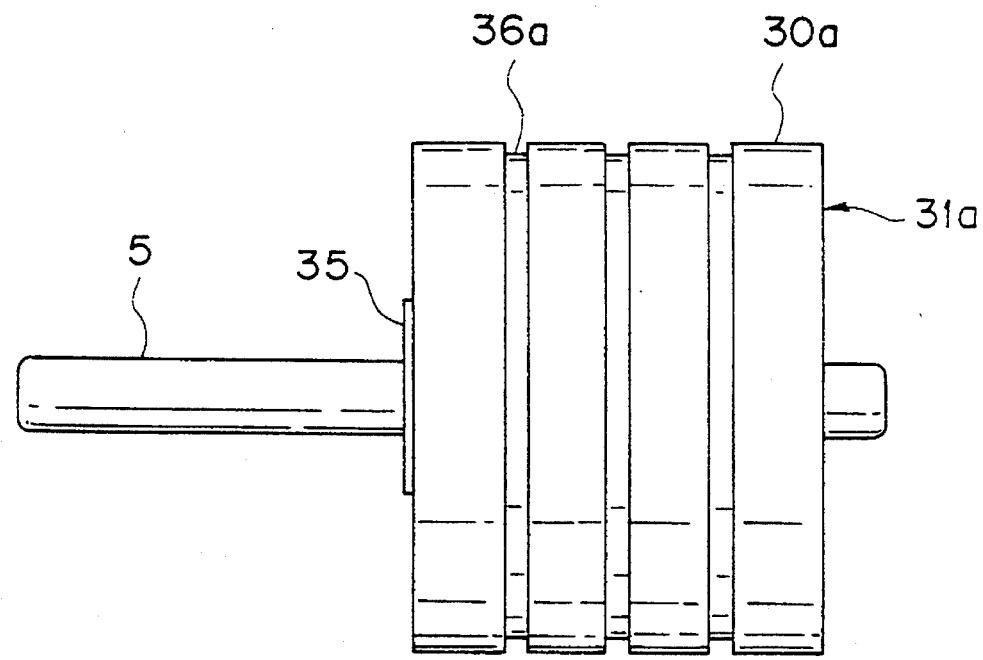
FIG. 6 is a longitudinal front view showing a rotor body according to another embodiment of the invention.
Figure 7:
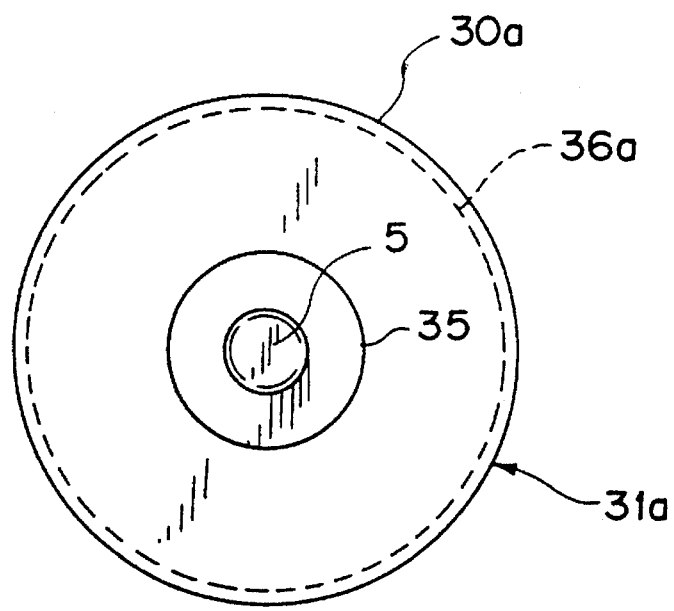
FIG. 7 is a side view showing the rotor body shown in FIG. 6.

As shown in FIGS. 6 and 7, a plurality of annular grooves 36a each of which has a rectangular cross section are juxtaposed along the centerline axial direction in an outer circumferential surface 30a of a rotor body 31a into which the rotary shaft 5 has been press fitted. By forming the annular grooves 36a, it is possible to form the corrugations in the outer circumferential surface 30a and to increase the surface area.

Thus, when the magnetic layer 32 is formed to cover the entire surface or parts of the outer circumferential surface 30a, the molten plastic magnet is introduced also into an interior of the annular grooves 36a and is integrated with the outer circumferential surface 30a. Accordingly, the magnetic layer 32 is firmly fixed to particularly increase the mechanical strength in the centerline axis direction.

Figure 8:
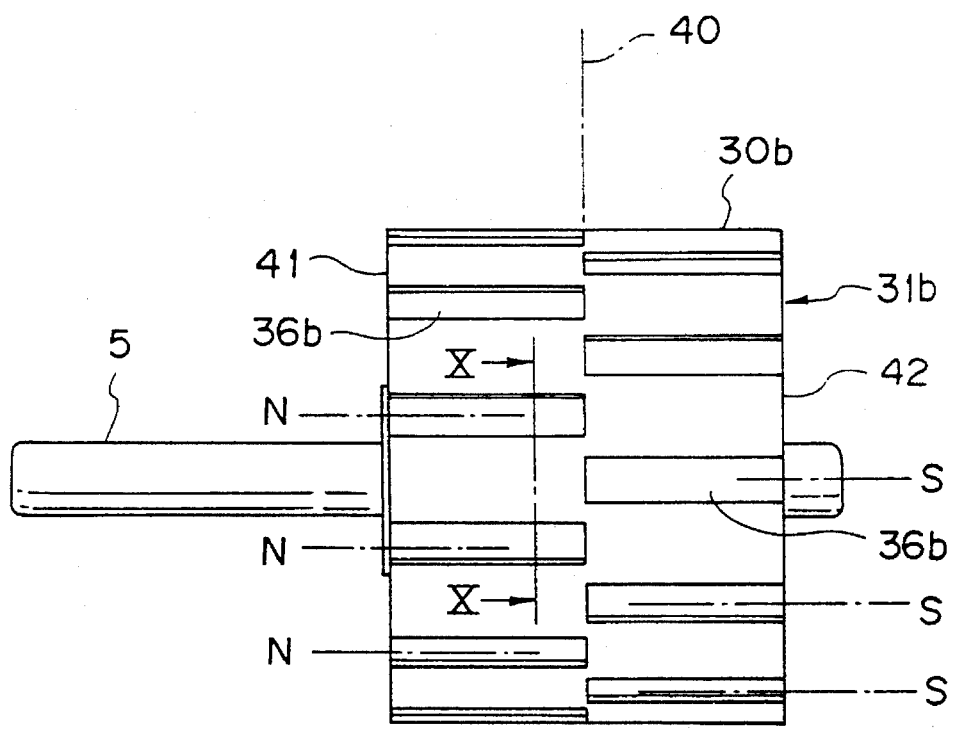
FIG. 8 is a longitudinal front view showing a rotor body according to still another embodiment of the invention.
Figure 9:
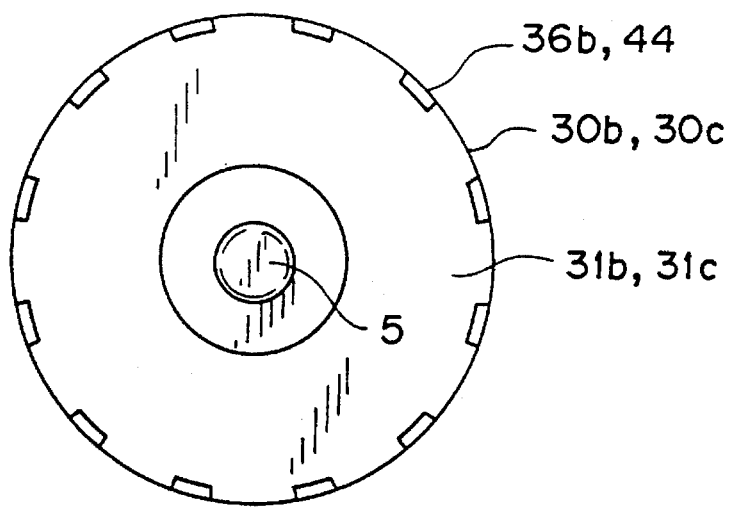
FIG. 9 is a side view showing the rotor body shown in FIG. 8.
Figure 10:
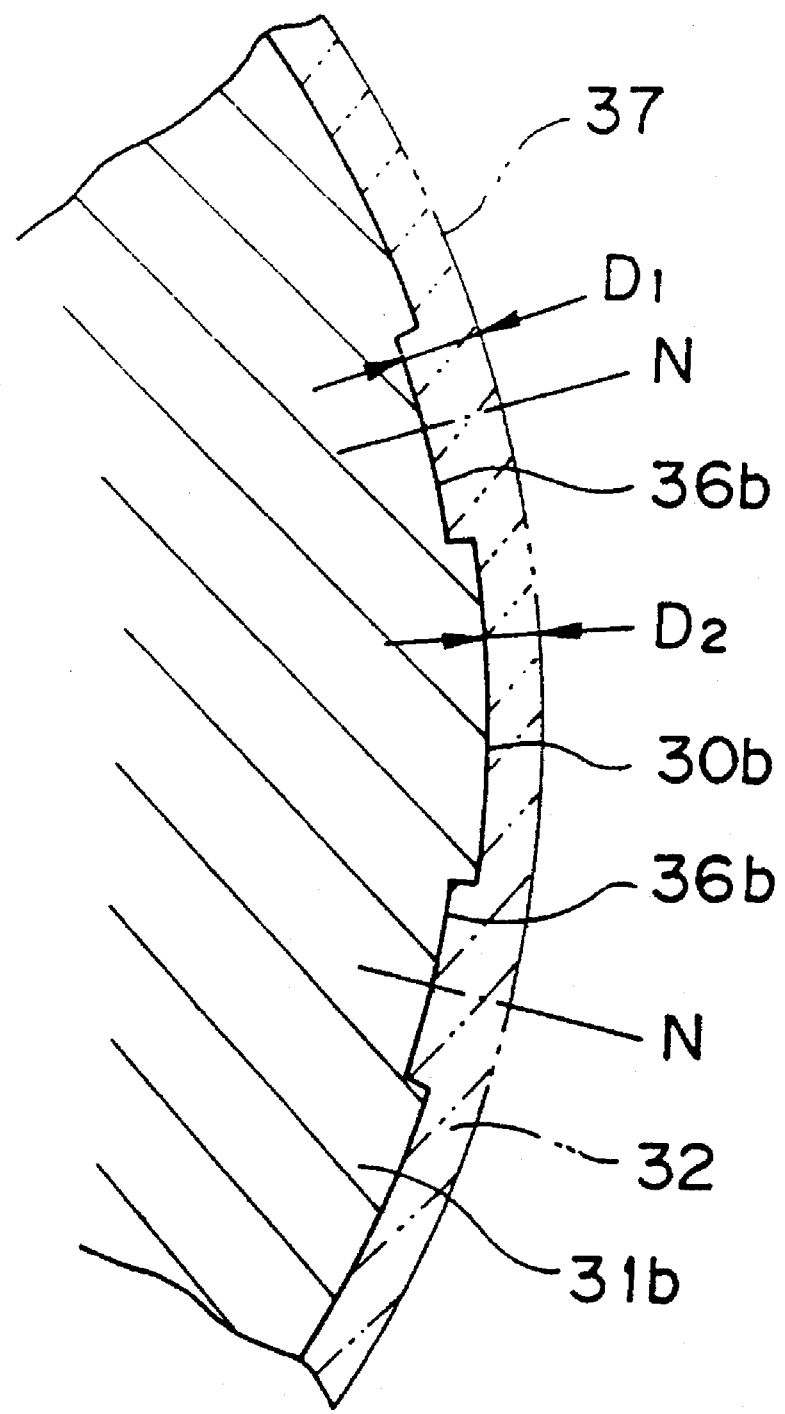
FIG. 10 is an enlarged sectional view taken along the line X—X of FIG. 8.

FIGS. 8 through 10 show still another embodiment.

As shown, in order to form the corrugation on an outer circumferential surface 30b of a rotor body 31b, a plurality of elongated recess portions 36b are formed in a direction from an axially central portion 40 toward a side portion 41 or 42 and are uniformly arranged in the circumferential direction. As shown in FIG. 10, each recess portion 36b is formed at a position corresponding to the associated N- or S-pole (N-pole case shown in the drawings) of the magnetic layer 32 formed on the outer circumferential surface 30b.

The N- and S-poles are alternately magnetized in a staggered manner relative to the axially central portion 40 in the magnetic layer 32. Each recess portion 36b is also formed in a staggered manner so as to align with each associated magnetic pole and to terminate at the axially central portion 40 (see FIG. 8).

Thus, as shown in FIG. 10, a thickness D1 of the magnetic layer 32 at the magnetic poles is larger than a thickness D2 of the portions other than the magnetic poles. Accordingly, it is possible to generate strong magnetic force by the magnetic poles of the magnetic layer 32 and to realize a much higher torque property with a minimum amount of the rare earth plastic magnet.

Also, since each recess portion 36b terminates at the axially central portion 40, the recess portion 36b serves as resistance so that the magnetic layer 32 is firmly fixed to the rotor body 31b without any movement in both axial and circumferential directions.

Figure 11:
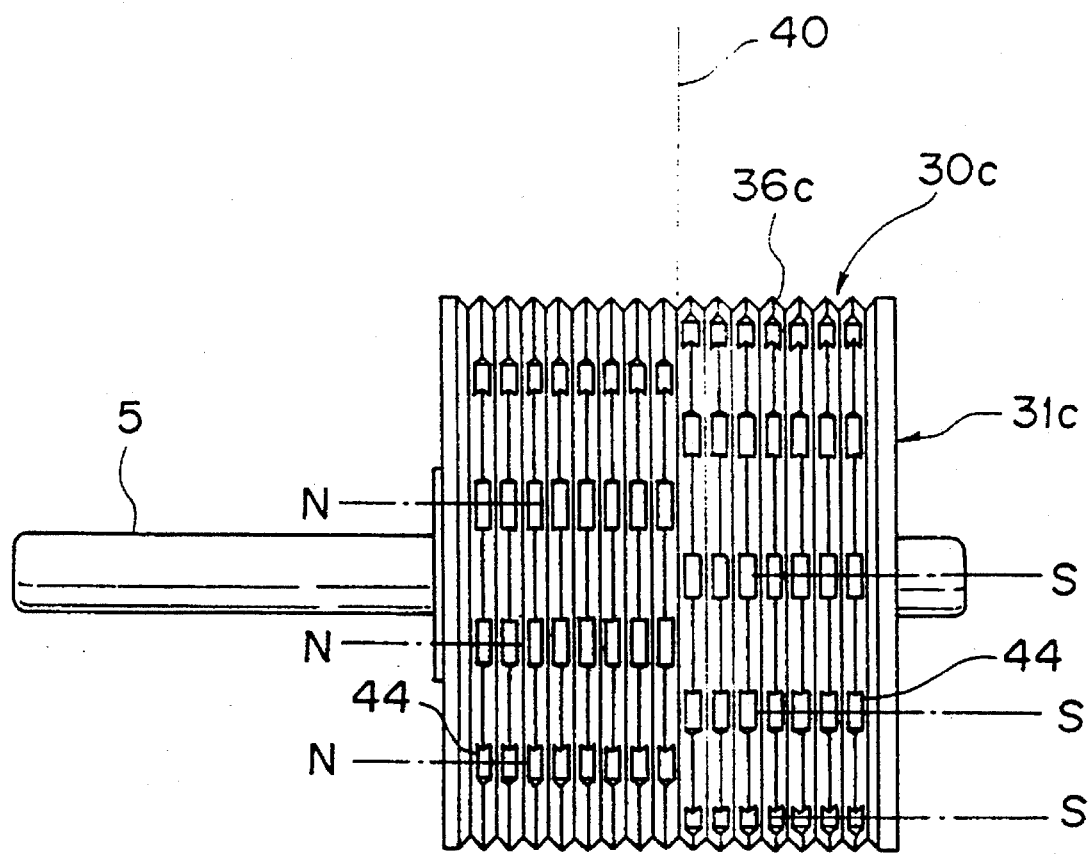
FIG. 11 is a longitudinal front view showing a rotor body according to still another embodiment of the invention.
Figure 12:
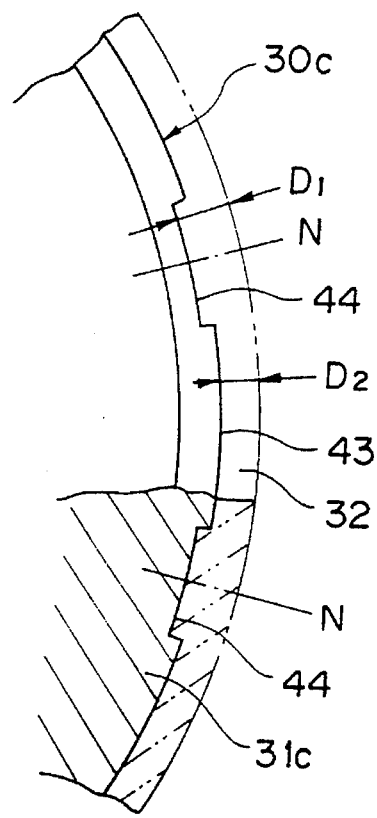
FIG. 12 is an enlarged sectional view showing the corrugations shown in FIG. 11.

FIGS. 11 and 12 show still another embodiment.

In this embodiment, annular corrugations 36c having a saw-toothed cross-sectional shape are formed in the circumferential direction in an outer circumferential surface 30c of a rotor body 31c. Also, recess portions 44 are formed at crest portions 43 of the saw-toothed shape and in a staggered manner at positions corresponding to the N- and S-poles of the magnetic layer 32 in the same manner as that shown in FIGS. 8 through 10.

Thus, a thickness D1 of the magnetic layer 32 at the portions of the magnetic poles is larger than a thickness D2 of the other portions to thereby generate the strong magnetic force by the poles. Also, the corrugations 36c and the recess portions 44 serve as resistance so that the magnetic layer 32 is firmly fixed in the axial direction and the circumferential direction to hardly generate the separation. Incidentally, the shape of the side face including that of the rotary body 31 is substantially the same as that shown in FIG. 9.

Figure 13:
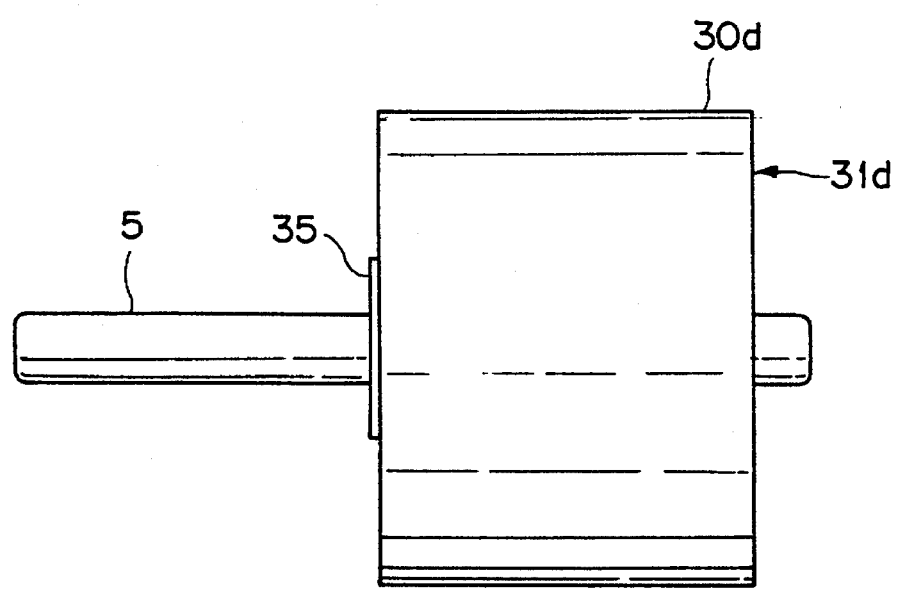
FIG. 13 is a longitudinal front view showing a rotor body according to still another embodiment of the invention.
Figure 14:
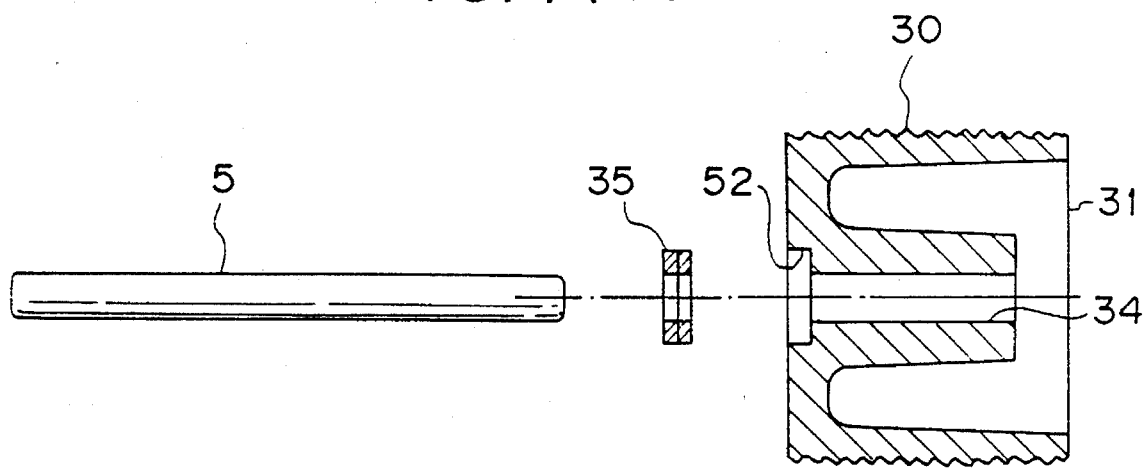
FIGS. 14A and 14B are sectional views showing a first manufacture step for producing a rotor according to the present invention.
Figure 14:
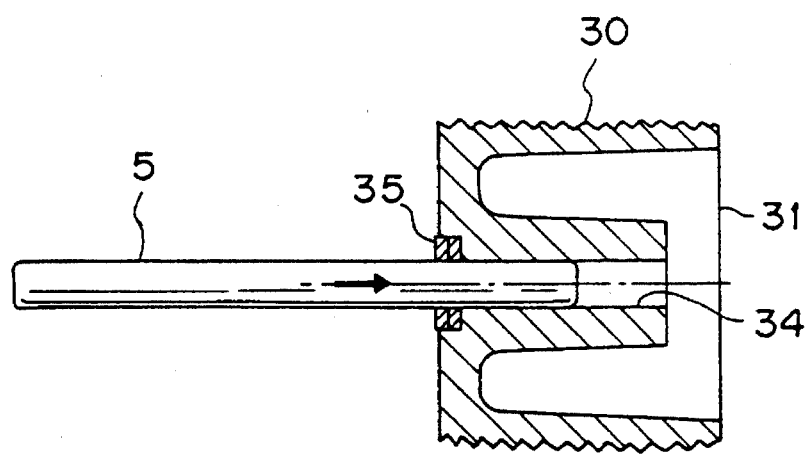

Also, as shown in FIG. 13, according to the invention, in the case where the corrugations are not formed on an outer circumferential surface 30d of a cylindrical rotor body 31d, it is possible to integrally form the rotary body 31d and the magnetic layer. In this case, since the corrugations are not provided on the outer circumferential surface 30d, it is easy to manufacture the rotor body 31d.

Figure 15A:
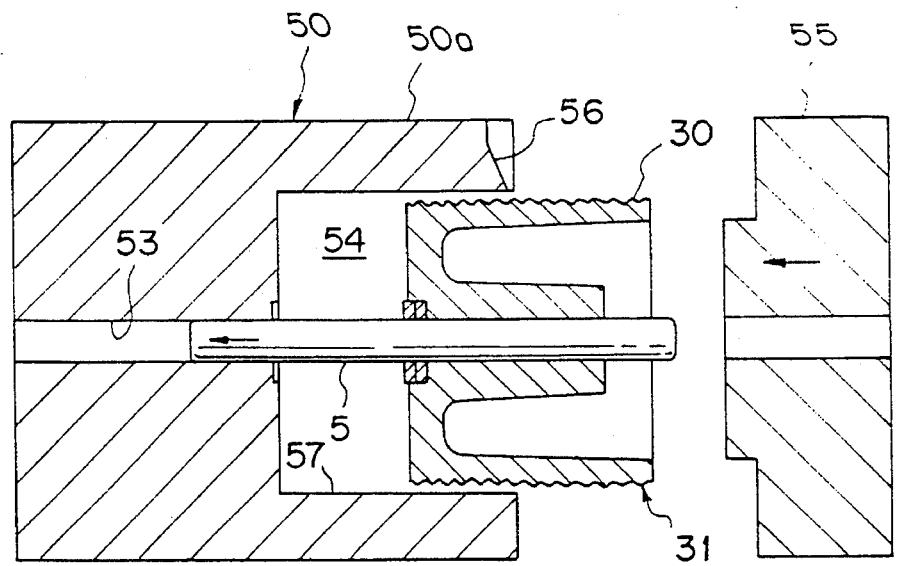
FIGS. 15A, 15B and 15C are sectional views showing a second manufacture step for producing the rotor according to the invention.
Figure 15B:
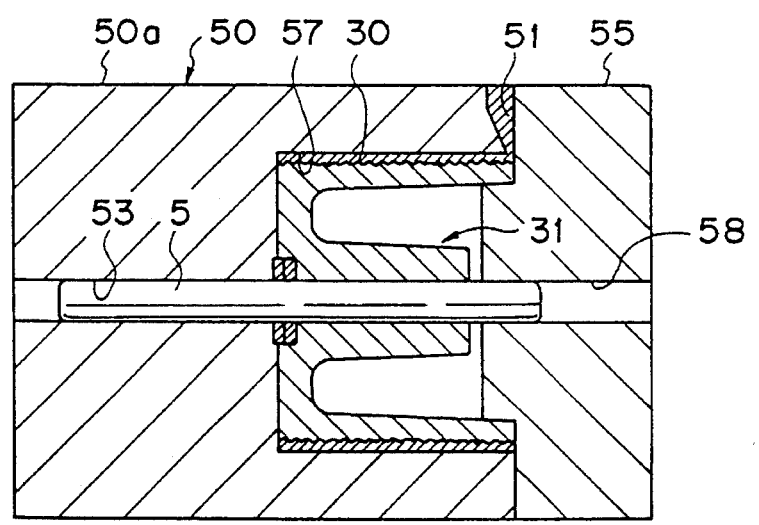
Figure 15C:
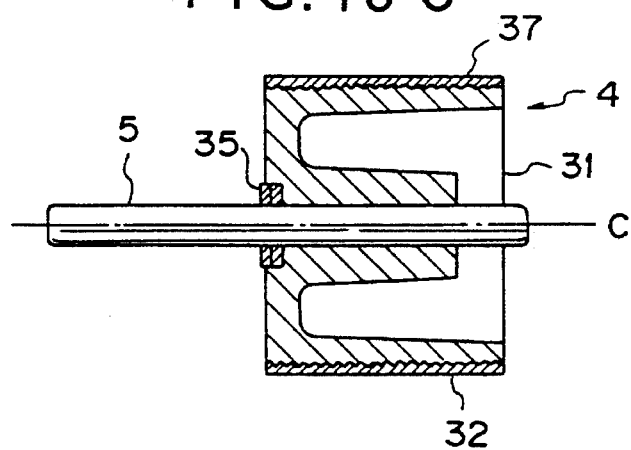

Subsequently, a method for producing the rotor will be described. FIGS. 14A and 14B are cross-sectional views showing a first manufacture step for producing the rotor. FIGS. 15A, 15B and 15C are cross-sectional views showing a second manufacture step for producing the rotor.

According to the invention, in a method for producing the rotor 4 for the stepping motor 1 that is used as the miniature electric motor in which the stator 3 and the rotor 4 facing the stator 3 are provided within the casing 2, first of all, the rotary shaft 5 is inserted into the rotor body 31, 31a, 31b, 31c or 31d made of plastic. It is preferable to form, in advance, the corrugations 36, 36a, 36b, 36c or 44 on the outer circumferential surface 30, 30a, 30b or 30c before the rotor body is installed within a molding die 50.

Subsequently, the rotor body is installed within the molding die 50 produced with high precision, and the rotary shaft 5 is positioned relative to the molding die 50. Thereafter, the rear-earth plastic magnet 51 heated and molten at a temperature that is higher than the softening point t1 of the rotor body is injected into the molding die 50. Consequently, the magnetic layer 32 is formed to cover at least parts corresponding to magnetic poles, or entirety of the outer circumferential surface of the rotor body 31 to thereby complete the formation of the rotor 4.

The method will be described in more detail by taking the rotor body 31 as an example out of the various rotor bodies of the respective embodiments. As shown in a step in the first manufacturing method shown in FIG. 14A, the rotary body 31, the rotary shaft 5 and the bush 35 for preventing from relatively rotating is prepared.

Then, as shown in a step in FIG. 14B, the rotary shaft 5 is fitly inserted into the through-hole 34 of the rotor body 31. The bush 35 is fixedly fitted into the retainer portion 52 formed in the rotor body 31 so that the rotor body 31 and the rotary shaft 5 are fixed to each other.

Subsequently, as shown in a step in the second manufacturing method shown in FIG. 15A, the rotary shaft 5 is inserted into the support hole 53 of a molding die body 50a of the molding die 50. The rotor body 31 is installed within a hollow portion 54 of the molding die 50.

Subsequently, as shown in a step in FIG. 15B, the hollow portion 54 is air-tightly closed by a cover 55 of the molding die 50, and at the same time, the rotary shaft 5 is inserted into a support hole 58 of the cover 55 to thereby firmly position the rotary shaft 5.

The rare earth plastic magnet 51 that is heated and molten at a temperature in a range of, for example, about 270° C. to about 320° C. higher than the softening point t1 of the rotor body 31 is introduced in between an inner circumferential surface 57 of the hollow portion 54 and the outer circumferential surface 30 of the rotor body 31 through a supply hole 56 for supplying the molten material. Then, as described above, the rare earth plastic magnet 51 is integrated with the entire surface (or parts) of the outer circumferential surface 30 to thereby complete the assembly of the rotor 4.

Finally, as shown in a step in FIG. 15C, the rotor 4 is removed from the molding die 50 and is gradually cooled down to the room temperature. The multiple pole magnetization is carried out so that the N- and S-poles are alternatively arranged on the outer surface 37. Accordingly, the rotor 4 having a high precision coaxiality of the rotary shaft 5 and the outer circumferential surface 37 with respect to the rotational centerline C is completed.

In other words, if the support hole 53 and the inner circumferential surface 57 of the molding die body 50a, the support hole 58 of the cover 55 and the like are manufactured with high precision, and the injection-molding is carried out under the condition that the rotary shaft 5 is supported by the support holes 53 and 58, the outer surface 37 of the rotor is formed with the circularity with extremely high precision to thereby realize the high level coaxiality.

Incidentally, although the foregoing embodiments are directed to the PM type stepping motor for explanation, it is quite obvious that the present invention may be equally applied to an HB (hybrid) type stepping motor or the like.

In the drawings, the same reference numerals are used to designate the like members or components.

Various details of the invention may be changed without departing from its spirit nor its scope. Furthermore, the foregoing description of the embodiments according to the invention is provided for the purpose of illustration only, and not for the purpose of limiting the invention as defined by the appended claims and their equivalents.

What is claimed is:

1. A method for producing a rotor for a miniature electric motor in which a stator is provided within a casing and the rotor is provided so as to face the stator, comprising the following steps of:

inserting a rotary shaft into a body of said rotor made of plastic;

subsequently incorporating the rotor body into a molding die and at the same time positioning said rotary shaft relative to said molding die; and thereafter, injecting rare earth plastic magnet material, heated and molten at a temperature higher than a softening point t1 of said rotor body, into said molding die and forming a magnetic layer on an outer circumferential surface of said rotor body.

2. The method according to claim 1, wherein corrugations are formed, in advance, on the outer circumferential surface of said rotor body before incorporating said rotor body into said molding die.

3. The method according to claim 1, further comprising the steps of:

removing said rotor from said molding die and gradually cooling said rotor down to a room temperature after forming the magnetic layer on the outer circumferential surface of said rotor body; and thereafter, effecting a multiple pole magnetization to alternatively arrange N- and S-poles on an outer periphery of said magnetic layer.

4. The method according to claim 1, wherein plastic material forming said rotary body and having a softening point t1 higher than a motor use temperature T is composed of at least one material selected from the group essentially consisting of polybutylene terephthalate, polyacetal and nylon (PA), and includes glass fiber;

whereby when said rare earth plastic magnet is injected onto the outer circumferential surface of said rotor body, a surface layer of said outer circumferential surface is softened or molten so that a joint portion with said rare earth plastic magnet is mutually engaged and mixed; and during a process of the mixture phenomenon, a part of the glass fiber is introduced into and entangled with the rare earth plastic magnet from the outer circumferential surface.

* * * * *